United States Patent [19]

Flotow

[11] 4,057,131
[45] Nov. 8, 1977

[54] MULTIPLE DISK CLUTCH STAMPED ADAPTER RING

[75] Inventor: Richard A. Flotow, Fort Wayne, Ind.

[73] Assignee: Dana Corporation, Toledo, Ohio

[21] Appl. No.: 684,626

[22] Filed: May 10, 1976

[51] Int. Cl.² .......................................... F16D 13/00
[52] U.S. Cl. ................................ 192/70.13; 192/112
[58] Field of Search ............... 192/112, 70.13, 70.17, 192/70.2

[56] References Cited

U.S. PATENT DOCUMENTS

| 2,090,265 | 8/1937 | Padgett | 192/70.13 |
| 3,162,284 | 12/1964 | Montgomery et al. | 192/70.2 |

Primary Examiner—Edgar W. Geoghegan
Attorney, Agent, or Firm—William J. Clemens

[57] ABSTRACT

An adapter ring attached to a clutch cover to extend the axial length of the clutch cover to accommodate a clutch assembly of increased length. The ring is of stamped construction and has a generally "U"-shaped cross-section with inner and outer legs and a central portion. Slots are formed in the ring for cooperating with lugs on a driven plate. Each slot is defined by an opening in the central portion of the ring, an adjacent portion of the outer leg as one side and a pair of tabs bent outwardly from the inner leg and welded to the outer leg.

5 Claims, 3 Drawing Figures

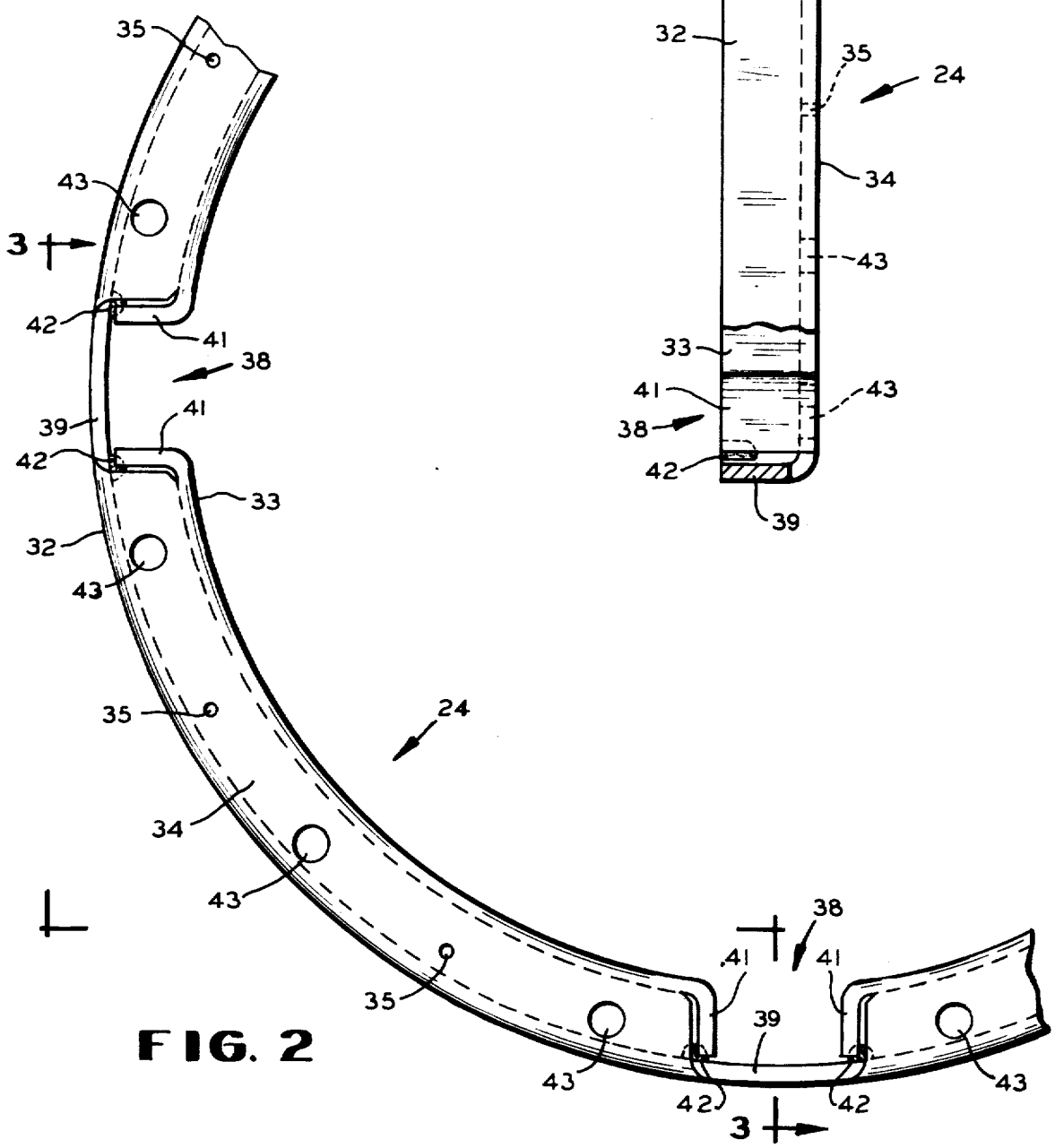

MULTIPLE DISK CLUTCH STAMPED ADAPTER RING

BACKGROUND OF THE INVENTION

1. Field of the Invention

The present invention relates to an adapter ring for converting a single disk clutch into a multiple disk clutch.

2. Description of the Prior Art

In general, a friction clutch for connecting an engine to a transmission or power take-off is enclosed in a bell-shaped housing which is secured to the engine block. The bell housing also encloses a flywheel which is attached to the output end of the engine crankshaft for rotation therewith. The flywheel has a friction face or driving surface which can be engaged by friction linings mounted on a clutch disk. The clutch disk is attached to an output shaft which may be connected to a set of gears in a transmission. A pressure plate is forced against the clutch disk by a plurality of clutch springs acting against a clutch cover attached to the flywheel. The clutch disk is forced into engagement with the driving surface of the flywheel such that the rotational movement of the engine is transmitted to the output shaft.

The torque transmitting capabilities of the single plate clutch can be increased by adding one or more clutch disks and an equal number of driven plates interposed between the clutch disks. However, the addition of the clutch disks and driven plates increases the axial length of the clutch assembly. Therefore, the single plate clutch cover is spaced away from the flywheel and can no longer be attached thereto.

One solution to the spacing problem is to provide a new clutch cover having the required axial spacing to extend from the flywheel to the outer extremities of the clutch. Such clutch covers can be of either a cast or stamped construction with the stamped construction being the preferred construction from a cost standpoint. The stamped construction can also have pressure plate drive lug recesses formed therein for rotating the driven plate therewith. Such a clutch cover is disclosed in U.S. Pat. No. 3,162,284, issued Dec. 22, 1964 to Byron D. Montgomery et al.

SUMMARY OF THE INVENTION

Another solution to the spacing problem is to provide an adapter ring for attaching the clutch cover to the flywheel. The present invention concerns a stamped adapter ring of a generally "U"-shaped cross-section for attaching a single disk clutch cover to a flywheel in a multiple disk clutch assembly. The "U"-shaped cross-section is defined by a central portion and inner and outer legs. Slots are formed in the ring for engaging the lugs on a driven clutch plate. When the ring is stamped, an aperture is formed to locate each slot and the inner leg is cut through between its outer edge and the aperture to form a pair of tabs. The tabs are bent toward the outer leg and tack welded thereto with the outer leg and the two tabs forming the three sides of the slot.

It is an object of the present invention to provide a less expensive multiple disk clutch assembly.

It is another object of the present invention to provide a means for converting a single disk clutch assembly into a multiple disk clutch assembly while retaining the single disk clutch cover.

It is a further object of the present invention to provide a clutch adapter ring which can be formed from a single sheet of material.

BRIEF DESCRIPTION OF THE DRAWINGS

FIG. 2 is a fragmentary side elevational view of the adapter ring of FIG. 1; and FIG. 3 is a front elevational view in partial cross-section of the adapter ring taken along the lines 3—3 of FIG. 2.

DESCRIPTION OF THE PREFERRED EMBODIMENT

Figure 1:
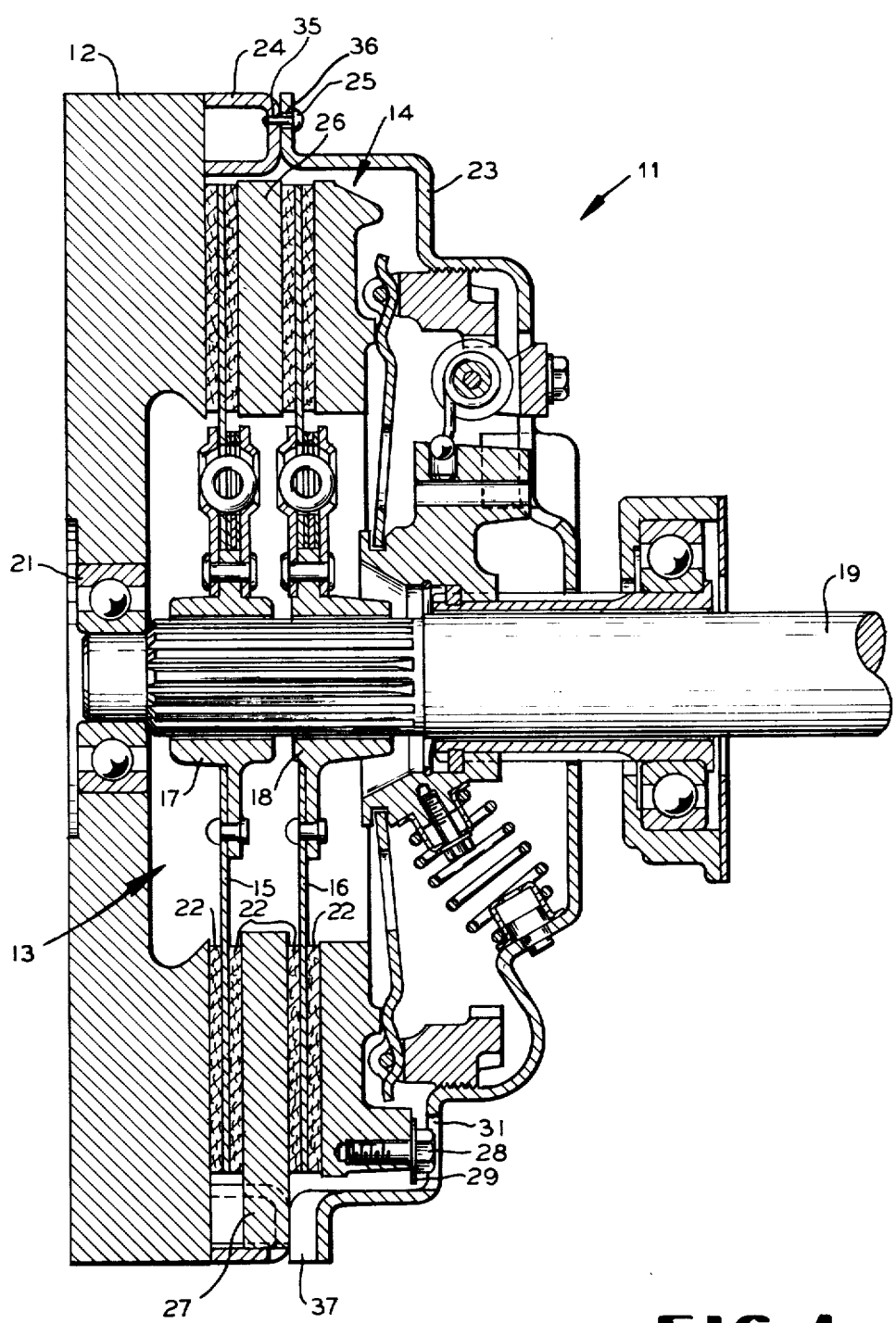
FIG. 1 is a diametrical sectional view of a clutch assembly including the present invention shown engaged with a flywheel.

FIG. 1 is a diametrical sectional view of a clutch assembly 11 attached to a flywheel 12. The flywheel 12 is secured to and rotates with an engine crankshaft (not shown). The rearwardly facing planar surface of the flywheel 12 is adapted to be engaged by a friction lining or facing on a clutch disk.

The clutch assembly 11 includes a driven clutch disk assembly 13 and a pressure plate 14. The disk assembly 13 comprises two annular clutch disks, a forward disk 15 and a rearward disk 16, secured to a pair of central hubs, hubs 17 and 18 respectively, which in turn are slidably splined on an output shaft 19. Typically, the rearward end of the output shaft 19 is connected to the gears of a transmission and the forward end is piloted in a bearing 21 retained in the flywheel 12 coaxial with the engine crankshaft. A friction facing 22 is provided on both faces of each of the clutch disks 15 and 16.

A clutch cover 23 is rotatably retained on the output shaft 19 and is secured to the flywheel 12 through an adapter ring 24 by any suitable means such as bolts (not shown). First the ring and then the cover can be installed on the flywheel or they can be assembled and installed as a unit. As shown, the cover and ring are secured together by any suitable fastening means such as plurality of serrated body rivets 25 spaced about the periphery of the clutch cover. A driven plate 26 is spaced intermediate the clutch disks 15 and 16 and has formed thereon a plurality of circumferentially spaced lugs 27 which engage slots formed in the periphery of the adapter ring 24. A plurality of bolts 28 are threaded into the rearwardly facing surface of the pressure plate 14 to retain drive straps 29, each strap having one end (not shown) fastened to the inner surface of the clutch cover 23 whereby the clutch cover drives the pressure plate. The other end (also not shown) of each drive strap 29 extends through an associated slot 31 in the clutch cover 23 to engage the outer surface of the clutch cover and function as a spring to pull the pressure plate 14 toward the clutch cover when the clutch is released from engagement. Alternately, the bolts 28 and straps 29 could be replaced by axially rearwardly extending driving lugs (not shown) which cooperate with the slots 31. As the flywheel 12 is rotated by the engine, the flywheel, the pressure plate 14, the clutch cover 23, the adapter ring 24, and the driven plate 26 rotate together.

Suitable means is provided to move the pressure plate 14 axially toward the flywheel 12 to compress the driven clutch disk assembly 13 against the flywheel. As the pressure plate 14 is moved, the friction facings 22 will initially engage the friction surfaces of the flywheel 12, the pressure plate 14 and the driven plate 26 such that the clutch disks 15 and 16 and the output shaft 19 tend to be driven into rotation. As the pressure plate 14 is moved from the initial engagement position to full engagement, the speed of rotation of the clutch disks 15 and 16 increases to approach the speed of rotation of the rest of the clutch assembly 11 and the flywheel 12, thereby decreasing the speed difference or slip between the friction facings 22 and the opposing friction surfaces.

The present invention concerns the adapter ring 24 which provides a means by which a single disk clutch assembly can be converted into a multiple disk clutch assemble. The clutch disk 16 and the clutch cover 23 are representative of similar elements of a single disk clutch assembly wherein the forwardly facing one of the friction facings 22 engages the friction surfaces of the flywheel and the clutch cover is attached directly to the flywheel. When it is desired to form a multiple disk clutch, clutch disks and driven plates are added. For example, in the dual disk clutch assembly of FIG. 1, the clutch disk 15 and the driven plate 26 have been added thereby increasing the axial length of the clutch assembly 11. The clutch cover 23 is now spaced from the flywheel 12 and can no longer be secured directly thereto. One prior art solution has been to form a new clutch cover of the required length. However, in accordance with the present invention, an adapter ring 24 is interposed between the flywheel 12 and the single disk clutch cover 23.

FIG. 2 is a fragmentary side elevational view of the adapter ring 24 of FIG. 1 and FIG. 3 is a front elevational view of the adapter ring 24 taken along the lines 3—3 of FIG. 2. The ring 24 is manufactured as a stamping and is generally "U"-shaped in cross-section having an outwardly facing leg 32, an inwardly facing leg 33 and a connecting central portion 34. The central portion 34 has a plurality of holes 35 formed therein for receiving and retaining the serrated bodies of the rivets 25. As shown in FIG. 1, the cover 23 has a hole 36 formed therein, the diameter of which is larger than the body of the rivet 25 to allow the cover to be adjusted to align the holes 36 with the holes 35. The number of holes 35 in the ring 24 can exceed the number of holes 36 in the cover 23 to provide alternate mounting positions to align raised areas 37 of the cover periphery with the lugs 27. The raised areas provide clearance for the lugs 27 when the clutch is disengaged and the driven plate 26 moves away from the flywheel 12.

The adapter ring 24 is provided with a plurality of slots 38 for receiving the lugs 27 of the driven plate 26 of FIG. 2. In FIGS. 2 and 3, there are shown two slots 38 of four slots which are equally spaced about the adapter ring 24 for receiving an equal number of lugs 27. Although four slots and lugs are utilized in the preferred embodiment, a greater or lesser number could be provided as desired. Each slot is defined by a portion 39 of the outwardly facing leg 32 and a pair of tabs 41 which are portions of the inwardly facing leg 33 bent toward the portion 39, the leg portion 39 and the tabs 41 forming three sides of the slot 38. The free ends of the tabs 41 are tack welded 42 to the leg portion 39 to provide a driving surface for the lug 27 of the driven plate 26.

Typically, the adapter ring 24 is stamped from a sheet of metal with the rivet holes 35, apertures in the central portion 34 to locate the slots 38 and holes 43 for the mounting bolts (not shown) which pass through the cover 23 and the ring 24 and threadably engage the flywheel 12 to secure the cover and ring thereto. The apertures also serve to allow movement of the lugs 27 through the adapter ring 24 as the clutch is disengaged. When the apertures are formed, the inwardly facing leg 33 is slit from the edge of the aperture to outer edge of the leg to form the tabs 41. As shown in FIG. 3, the aperture is notched in a direction away from the tabs 41 and along the junction of the leg 33 and the central portion 34 to facilitate the bending of the tabs toward the leg portion 39.

In summary, the present invention concerns an adapter ring for converting a single disk clutch assembly into a multiple disk clutch assembly having two or more driven disks. The single disk clutch assembly is attached to a driving member such as a flywheel, and includes a pressure plate, a first annular clutch disk interposed between the driving member and the pressure plate, a clutch cover attached to the driving member and having an axial length sufficient to encompass the single disk clutch assembly, and pressure spring members acting on said pressure plate and said clutch cover to engage said first clutch disk and said pressure plate against said driving member. When a second clutch disk is added and a driven plate is interposed between the clutch disks, the clutch cover is moved axially away from the driving member. The adapter ring is interposed between and connected to the driving member and the clutch cover to enable the clutch cover to be utilized in a multiple disk clutch assembly.

The adapter ring has a generally "U"-shaped cross-section with a central portion connected to outwardly and inwardly facing legs. Apertures are formed in the central portion to locate slots for receiving driving lugs on the driven plate and to allow axial movement of the lugs as the clutch assembly is engaged and disengaged. The slots are defined by a portion of the outwardly facing leg and a pair of tabs which are portions of the inwardly facing leg bent toward the outwardly facing leg and tack welded thereto to form the three sides of the slots.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. An adapter ring attached to a clutch cover to extend the axial length of the clutch cover to accommodate a clutch assembly of increased length, the adapter ring comprising: a stamped sheet metal annular element having a generally "U"-shaped cross-section with a central portion, an outwardly facing leg and an inwardly facing leg wherein said central portion and said inwardly facing leg have a plurality of slots formed therein for receiving lugs of a driven plate.

2. An adapter ring according to claim 1 wherein said adapter ring central portion has an aperture formed therein to locate each of said slots and said inwardly facing leg is slit from an edge of said aperture to an outer edge of said inwardly facing leg to form two tabs which are bent toward a portion of said outwardly facing leg, said outwardly facing leg portion and said tabs forming three sides of said slot.

3. An adapter ring according to claim 2 wherein the free ends of said tabs are welded to said outwardly facing leg portion.

4. An adapter ring according to claim 2 wherein said aperture is notched in a direction away from said tabs along the junction of said inwardly facing leg and said central portion to facilitate the bending of said tabs toward the outwardly facing leg portion.

5. An adapter ring attached to a clutch cover for increasing the axial length of the clutch cover to convert a single disk clutch assembly into a multiple disk clutch assembly for mounting on a driving member, the multiple disk clutch assembly including a pressure plate; a first clutch disk interposed between said driving member and said pressure plate; at least a second clutch disk interposed between said driving member and said first clutch disk; at least one driven plate, said driven plate interposed between said first and second clutch disks; pressure spring members acting on said pressure plate and said clutch cover to engage said pressure plate, said first and second clutch disks and said driven plate against said driving member; and said adapter ring interposed between and connected to said driving member and said clutch cover, said adapter ring comprising: a stamped sheet metal annular element having a generally "U"-shaped cross-section with a central portion, an outwardly facing leg and an inwardly facing leg wherein said central portion and said inwardly facing leg have a plurality of slots formed therein for receiving the lugs of said driven plate.

* * * * *